US012574408B2

(12) United States Patent
Devane et al.

(10) Patent No.: US 12,574,408 B2
(45) Date of Patent: Mar. 10, 2026

(54) POST-INCIDENT ALERTS FOR PII DATA LOSS

(71) Applicant: McAfee, LLC, San Jose, CA (US)

(72) Inventors: Oliver G. Devane, Upton (GB); Vallabh Prakash Chole, Aurangabad (IN); Ankit Goel, Uttar Pradesh (IN); Abhishek Ajay Karnik, Portland, OR (US)

(73) Assignee: McAfee, LLC, San Jose, CA (US)

( * ) Notice: Subject to any disclaimer, the term of this patent is extended or adjusted under 35 U.S.C. 154(b) by 322 days.

(21) Appl. No.: 18/100,619

(22) Filed: Jan. 24, 2023

(65) Prior Publication Data

US 2024/0250985 A1 Jul. 25, 2024

(51) Int. Cl.
*H04L 9/40* (2022.01)
*G06F 21/62* (2013.01)

(52) U.S. Cl.
CPC ...... *H04L 63/1483* (2013.01); *G06F 21/6245* (2013.01)

(58) Field of Classification Search
CPC ............ H04L 63/1483; H04L 63/1425; G06F 21/6245; G06F 2221/2119; H04W 12/02
See application file for complete search history.

(56) References Cited

U.S. PATENT DOCUMENTS

| 8,019,689 B1 | 9/2011 | Nachenberg |
| 8,875,284 B1 | 10/2014 | Newstadt et al. |

| 8,914,323 B1* | 12/2014 | Allen | .................... | G06F 16/245 |
| | | | | 707/623 |
| 2009/0064325 A1 | 3/2009 | Ford et al. | | |
| 2010/0251369 A1* | 9/2010 | Grant | .................... | G06F 21/554 |
| | | | | 726/23 |
| 2012/0185942 A1* | 7/2012 | Dixon | .................... | G06F 21/44 |
| | | | | 726/22 |
| 2013/0276105 A1* | 10/2013 | Hinchliffe | ............. | G06F 3/0482 |
| | | | | 726/22 |
| 2015/0248668 A1* | 9/2015 | Radu | .................... | G06Q 20/322 |
| | | | | 705/71 |
| 2016/0294867 A1* | 10/2016 | Tao | .................... | H04L 63/1416 |

(Continued)

OTHER PUBLICATIONS

Novakovic et al., "Detection of URL-based Phishing Attacks Using Neural Networks", Sep. 2022, International Conference on Theoretical and Applied Computer Science and Engineering, pp. 132-136 (Year: 2022).*

*Primary Examiner* — Kenneth W Chang
(74) *Attorney, Agent, or Firm* — Patent Capital Group

(57) ABSTRACT

A computer-implemented method provides phishing mitigation. Upon a human user accessing a website, request from a cloud reputation service a reputation for a uniform resource locator (URL) associated with the website; determine that the URL does not have a reliable reputation; determine that the human user has entered data into the website, and that the data comprise sensitive data; log a data packet in a user sensitive information data store, wherein the data packet includes the URL and at least some of the sensitive data; periodically query the cloud reputation service to determine whether the URL has received a reliable reputation; and upon determining that the URL has received a reputation as a phishing website, notify the human user and provide a recommendation for a remedial action to protect the sensitive data.

17 Claims, 7 Drawing Sheets

(56) References Cited

U.S. PATENT DOCUMENTS

| | | | |
|---|---|---|---|
| 2016/0380977 A1* | 12/2016 | Bean | G06F 21/566 |
| | | | 726/12 |
| 2019/0268305 A1* | 8/2019 | Xu | G06F 16/285 |
| 2019/0349351 A1* | 11/2019 | Verma | H04L 63/30 |
| 2020/0082279 A1* | 3/2020 | Arora | G06F 21/53 |
| 2020/0143500 A1* | 5/2020 | DeBeaune | G06F 21/554 |
| 2020/0250477 A1* | 8/2020 | Barthur | G06F 11/0751 |
| 2021/0014269 A1* | 1/2021 | Devane | H04L 63/1483 |
| 2021/0125615 A1 | 4/2021 | Medalion et al. | |
| 2021/0176272 A1* | 6/2021 | Maha | G06F 21/552 |
| 2021/0344485 A1* | 11/2021 | Levin | H04L 9/0825 |
| 2022/0263843 A1* | 8/2022 | Aslam | H04L 41/22 |

* cited by examiner

POST-INCIDENT ALERTS FOR PII DATA LOSS

FIELD OF THE SPECIFICATION

This application relates in general to network security, and more particularly though not exclusively to a system and method for post-incident alerts for PII data loss.

BACKGROUND

Modern computing users face substantial data loss dangers from phishing attacks.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
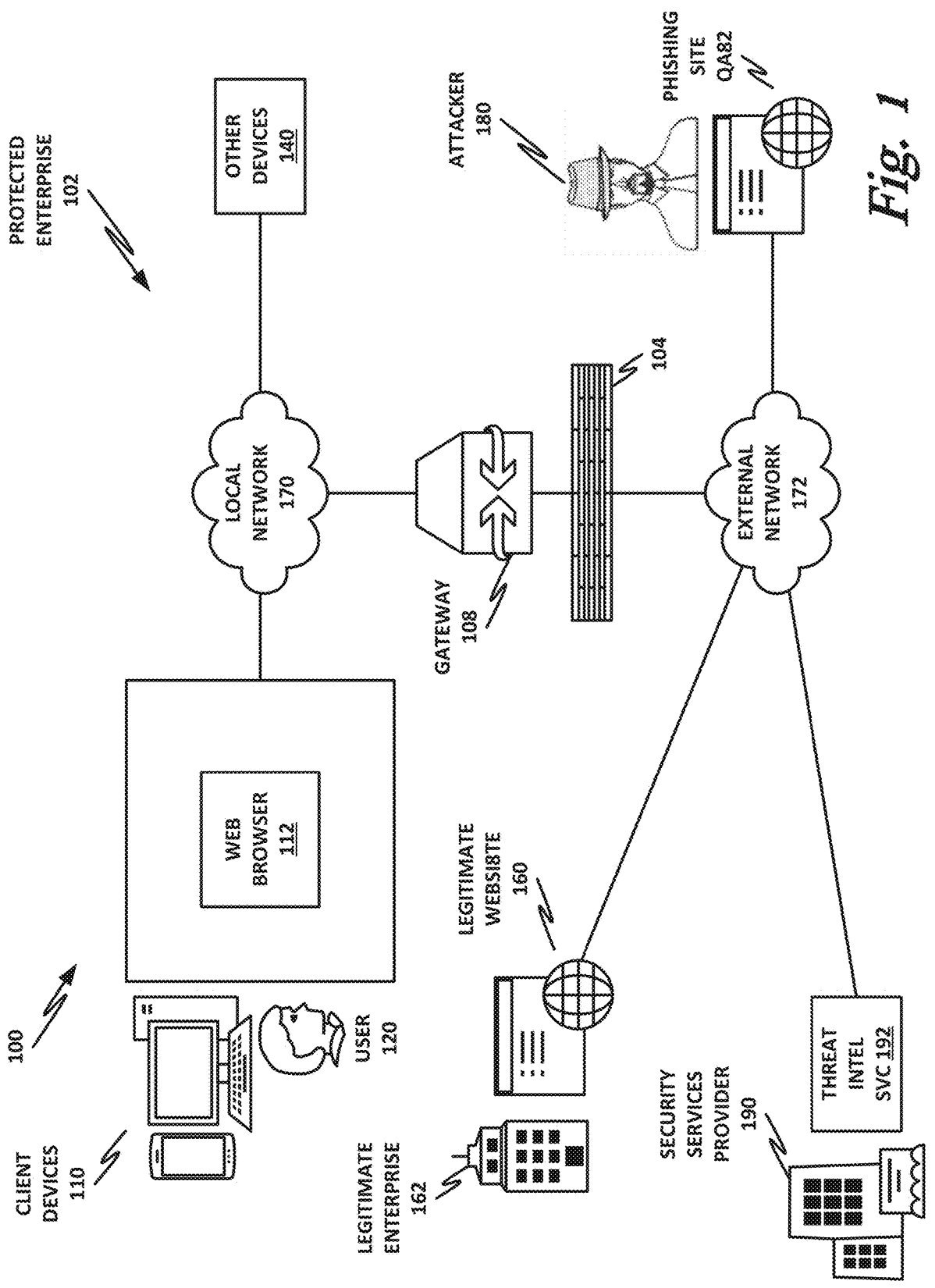
FIG. 1 is a block diagram of selected elements of a phishing mitigation ecosystem.

A computer-implemented method provides phishing mitigation. Upon a human user accessing a website, request from a cloud reputation service a reputation for a uniform resource locator (URL) associated with the website; determine that the URL does not have a reliable reputation; determine that the human user has entered data into the website, and that the data comprise sensitive data; log a data packet in a user sensitive information data store, wherein the data packet includes the URL and at least some of the sensitive data; periodically query the cloud reputation service to determine whether the URL has received a reliable reputation; and upon determining that the URL has received a reputation as a phishing website, notify the human user and provide a recommendation for a remedial action to protect the sensitive data.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Overview

Phishing is a type of cybersecurity attack in which the attacker attempts to deceive a user into disclosing sensitive information. A common type of phishing attack is one in which the attacker creates a URL that hosts a website that mimics a legitimate website of a legitimate business, such as a financial institution, an e-commerce site, an e-payment site, or similar. When the user clicks on the link, he or she may be directed to a website hosted by the attacker. The user may then mistakenly believe that he or she is interacting with the legitimate website and may enter sensitive information, such as a username, password, account number, or other sensitive information. Such sensitive information is referred to herein as personally identifying information (PII). PII may not be limited to only personal data but may also include enterprise data, such as data associated with a business of the user. Thus, PII leakage is a very serious concern for phishing mitigation.

A security services provider may maintain a database of known URLs with associated reputations for each one. Legitimate websites may have a good or a clean reputation, while known phishing websites may have a bad or a malicious reputation. When a user running a security agent provided by the security services provider visits a website, the security agents (e.g., a browser plug-in or similar) may query a threat intelligence database, which may be cloud-based. The threat intelligence database may return a reputation for the visited URL, and the plug-in may warn the user if the user attempts to visit a known phishing website. In certain embodiments, the plug-in may also block known phishing websites or take other remedial action to prevent users from leaking PII to known phishing websites.

One challenge associated with phishing websites is that phishing operators know that security agents can easily identify and remediate known phishing websites. Thus, phishing operators may change URLs frequently to ensure that they are using fresh URLs that will not tip the users off. New phishing websites can be created from templates and with automated tools in a matter of minutes. These phishing websites can then operate indiscriminately until they're identified and classified by the threat intelligence database. Thus, there is a window of time between website creation and website classification in which the operator may phish some victims before cybersecurity companies are able to provide protection against the malicious website. This leads to a gap where users may have already entered information such as credit card numbers, bank details, usernames, passwords, or other PII before the users were aware that the website is a phishing website. The phishing actors may then sell these PII data online where they can be exploited by other bad actors. In the meantime, the users may not even know that their personal data have been compromised.

The present specification provides a system and method to remediate phishing attacks in the particular case where a URL does not yet have a known reputation. The system may keep track of data inputted by the user who enters PII data, such as credit cards, bank details, email, username, password, passport, company proprietary data, or others. These data may be entered on websites that do not currently have a known classification or reputation. If the unknown website's classification later changes to malicious, an alert may be sent to the user to notify him or her that PII data were entered on a malicious website. The notification may provide guidance to help the user mitigate potential harm done by the phishing attack, such as changing passwords, canceling credit cards, or otherwise invalidating data that may have been compromised.

Alerts to the end user may be provided via a pop-up, a push notification, a product alert on a security agent, an SMS, an email that the user receives, or via other channels that are likely to get the user's attention and provide an adequate warning.

Alternatively, after a user has entered PII data onto a website with an unknown URL, the website may later be classified as clean thus indicating that the PII data entered were appropriate. In this case, old data associated with the user and that website may be removed from the database to ensure that erroneous notifications are not sent.

This system enables customers to protect themselves by changing passwords, deactivating credit cards, or otherwise invalidating data before malicious actors are able to use them or to further exploit them. This is advantageous as compared to a system wherein the user may be unaware that data have been compromised and may be sold, and thus the user is unlikely to take action.

Selected Examples

The foregoing can be used to build or embody several example implementations, according to the teachings of the present specification. Some example implementations are included here as nonlimiting illustrations of these teachings.

Example 1 is a computer-implemented method of providing phishing mitigation, comprising: upon a human user accessing a website, requesting from a cloud reputation service a reputation for a uniform resource locator (URL) associated with the website; determining that the URL does not have a reliable reputation; determining that the human user has entered data into the website, and that the data comprise sensitive data; logging a data packet in a user sensitive information data store, wherein the data packet comprises the URL and at least some of the sensitive data; periodically querying the cloud reputation service to determine whether the URL has received a reliable reputation; and upon determining that the URL has received a reputation as a phishing website, notifying the human user and providing a recommendation for a remedial action to protect the sensitive data.

Example 2 is the computer-implemented method of example 1, further comprising deleting the data packet from the user sensitive information data store after notifying the human user.

Example 3 is the computer-implemented method of example 1, wherein the sensitive data comprise personally identifying information (PII).

Example 4 is the computer-implemented method of example 1, wherein the sensitive data comprise sensitive business data.

Example 5 is the computer-implemented method of example 1, wherein determining that the data comprise sensitive data includes regular expression matching.

Example 6 is the computer-implemented method of example 1, wherein determining that the data comprise sensitive data includes matching field labels.

Example 7 is the computer-implemented method of example 1, wherein determining that the data comprise sensitive data includes operating a neural network software.

Example 8 is the computer-implemented method of example 1, wherein the recommendation comprises changing a username or password.

Example 9 is the computer-implemented method of example 1, wherein the recommendation comprises canceling a credit card.

Example 10 is the computer-implemented method of example 1, wherein the user sensitive information data store is a local database.

Example 11 is the computer-implemented method of example 1, wherein logging the data packet comprises locally encrypting the data packet.

Example 12 is the apparatus comprising means for performing the computer-implemented method of any of examples 1-11.

Example 13 is the apparatus of example 12, wherein the means for performing the computer-implemented method comprise a processor and a memory.

Example 14 is the apparatus of example 13, wherein the memory comprises machine-readable instructions that, when executed, cause the apparatus to perform the computer-implemented method of any of examples 1-11.

Example 15 is the apparatus of any of examples 12-14, wherein the apparatus is a computing system.

Example 16 is at least one computer readable medium comprising instructions that, when executed, implement a method or realize an apparatus as in any of examples 1-15.

Example 17 is or more tangible, nontransitory computer-readable storage media having stored thereon executable instructions to provide an endpoint security agent for an endpoint, wherein the endpoint security agent is to: determine that a user of the endpoint has accessed a website; request from a uniform resource locator (URL) reputation service a reputation for a URL associated with the website; receive a response that the URL does not have a known reputation; determine that the user has entered data into the website, and that the data comprise sensitive data; log, into a local user sensitive information database, a data packet in comprising the URL and at least some of the sensitive data; later query the URL reputation service to determine that the URL has received a new reputation; and upon determining that the new reputation is a phishing reputation, notify the user of the endpoint and recommend a remedial action to protect the sensitive data.

Example 18 is the one or more tangible, nontransitory computer-readable media of example 17, further comprising deleting the data packet from local user sensitive information database after notifying the user.

Example 19 is the one or more tangible, nontransitory computer-readable media of example 17, wherein the sensitive data comprise personally identifying information (PII).

Example 20 is the one or more tangible, nontransitory computer-readable media of example 17, wherein the sensitive data comprise sensitive business data.

Example 21 is the one or more tangible, nontransitory computer-readable media of example 17, wherein determining that the data comprise sensitive data includes regular expression matching.

Example 22 is the one or more tangible, nontransitory computer-readable media of example 17, wherein determining that the data comprise sensitive data includes matching field labels.

Example 23 is the one or more tangible, nontransitory computer-readable media of example 17, wherein determining that the data comprise sensitive data includes operating a neural network software.

Example 24 is the one or more tangible, nontransitory computer-readable media of example 17, wherein the remedial action comprises changing a username or password.

Example 25 is the one or more tangible, nontransitory computer-readable media of example 17, wherein the remedial action comprises canceling a credit card.

Example 26 is the one or more tangible, nontransitory computer-readable media of example 17, wherein local user sensitive information database is a local database.

Example 27 is the one or more tangible, nontransitory computer-readable media of example 17, wherein logging the data packet comprises locally encrypting the data packet.

Example 28 is a computing apparatus, comprising: a processor circuit and a memory; a network interface; a web browser; and an endpoint security agent, wherein the endpoint security agent comprises instructions encoded within the memory to instruct the processor circuit to: observe a user's interaction with a website via the network interface, including a uniform resource locator (URL) associated with the website; request, via a cloud-based URL intelligence service, a reputation for the URL; receive a response that the URL does not have a known reputation; determine that the user has entered data into the website, and that the data comprise sensitive data; log, into a local user sensitive information database, a data packet comprising the URL and at least some of the sensitive data; later query the URL intelligence service to determine that the URL has received a new reputation; and upon determining that the new reputation is a phishing reputation, notify the user of the computing apparatus and recommend a remedial action to protect the sensitive data.

Example 29 is the computing apparatus of example 28, further comprising deleting the data packet from a local user sensitive information database after notifying the user.

Example 30 is the computing apparatus of example 28, wherein the sensitive data comprise personally identifying information (PII).

Example 31 is the computing apparatus of example 28, wherein the sensitive data comprise sensitive business data.

Example 32 is the computing apparatus of example 28, wherein determining that the data comprise sensitive data includes regular expression matching.

Example 33 is the computing apparatus of example 28, wherein determining that the data comprise sensitive data includes matching field labels.

Example 34 is the computing apparatus of example 28, wherein determining that the data comprise sensitive data includes operating a neural network software.

Example 35 is the computing apparatus of example 28, wherein the remedial action comprises changing a username or password.

Example 36 is the computing apparatus of example 28, wherein the remedial action comprises canceling a credit card.

Example 37 is the computing apparatus of example 28, wherein a local user sensitive information database is a local database.

Example 38 is the computing apparatus of example 28, wherein logging the data packet comprises locally encrypting the data packet.

DETAILED DESCRIPTION OF THE DRAWINGS

A system and method for post-incident alerts for PII data loss will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of selected elements of a phishing mitigation ecosystem 100. In the example of FIG. 1, ecosystem 100 may be an enterprise, a small business, a charity, a government entity, a data center, a telecommunications provider, a "smart home" with computers, smart phones, and various IoT devices, or any other suitable ecosystem. Security ecosystem 100 is provided herein as an illustrative and nonlimiting example of a system that may employ, and benefit from, the teachings of the present specification.

Ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 with multiple client devices 110 are illustrated here for simplicity, but a home or enterprise may have multiple users, each of which may have multiple devices, such as desktop computers, laptop computers, smart phones, tablets, hybrids, or similar. Client devices 110 may include one or more web browsers 112, which user 120 may use to access websites and other network-based resources.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as DHCP, network address translation (NAT), gateway services, router services, and switching services, and may act as a security portal across local boundary 104.

In some embodiments, gateway 108 may be a simple home router, or may be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features SFC or NFV, gateway 108 may be include one or more service functions and/or virtualized network functions.

Local network 170 may also include other devices 140, which may include devices operated by other users, IoT devices, smart home devices, printers, infrastructure, and other network connected devices.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

User 120 may operate devices 110 to access web resources, including for example a legitimate website 160 provided by a legitimate enterprise 162. In some cases, enterprise 162 may operate services such as banking, asset trading, exchanges, e-commerce, social media, or other services. These services may, by nature, involve PII, financial data, credit cards, Social Security numbers, or other sensitive information associated with user 120. Enterprise 162 may use these data for legitimate business purposes that user 120 considers beneficial.

An attacker 180 may intend to compromise the security, privacy, or data integrity of user 120, or of enterprise 102. To this end, attacker 180 may operate a phishing site 182. Phishing site 182 may commonly be designed to mimic features of legitimate website 160, such as by providing a similar layout, graphics, interfaces, colors, logos, and other elements that makes phishing website 182 appear to be a legitimate website of enterprise 162. The intent of phishing website 182 may be to deceive user 120 into disclosing to attacker 180 sensitive information, such as information that user 120 may use to operate or interact with legitimate website 160.

Attacker 180 may use these data to steal money, information, passwords, or other useful content from user 120. Attacker 180 may use these data to enrich himself or herself at the expense of user 120 and/or enterprise 102. In enterprise contexts, attacker 180 may also want to commit industrial or other espionage, such as stealing classified or proprietary data, stealing identities, or gaining unauthorized access to enterprise resources.

Protected enterprise 102 may contract with or subscribe to a security services provider 190, which may provide security services, updates, antivirus definitions, patches, products, and services, including phishing mitigation. MCAFEE, LLC is a nonlimiting example of such a security services provider that offers comprehensive security and antivirus solutions. In some cases, security services provider 190 may include a threat intelligence service 192 such as the global threat intelligence (GTI™) database provided by MCAFEE, LLC, or similar competing products. Threat intelligence services are useful in the phishing context because they may include a database of known URLs, and associated reputation for each, including indications of which URLs are known to host phishing content. Security services provider 190 may update its threat intelligence database by analyzing new candidate websites as they appear on the internet and categorizing them as "safe" or "malicious" (or similar). A threat intelligence database may also classify websites, including non-phishing websites, according to the type of content they offer.

Other security considerations within ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
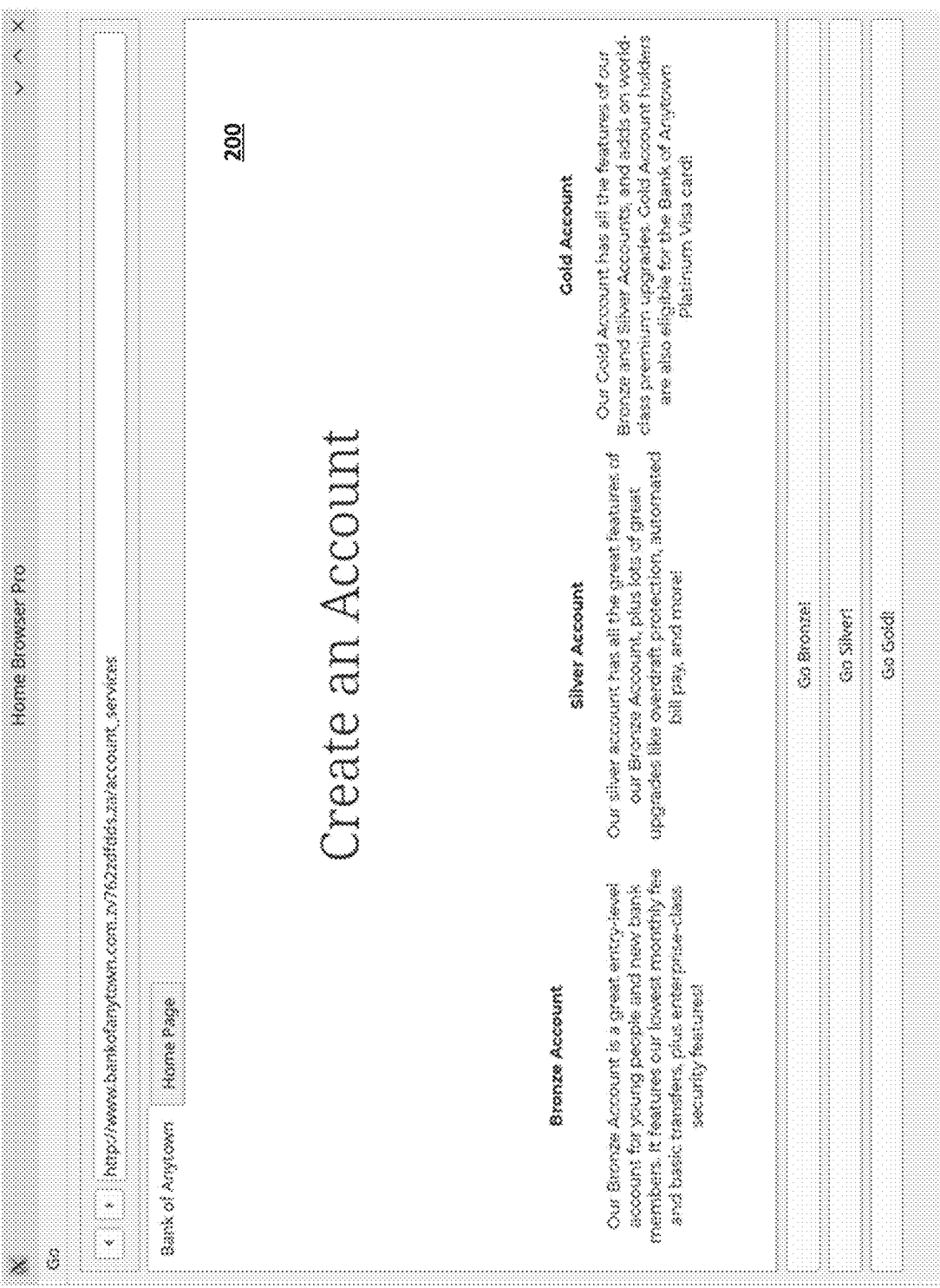
FIG. 2 is an illustration of selected elements of a web interface.

FIG. 2 is an illustration of selected elements of a web interface. In user interface 200, the user may operate a browser to access a website. The link in the website may have been provided, for example, in an email or a text message or by some other means. In this example, the website appears to be the account creation page of the fictional Bank of Anytown. However, a careful examination of the URL will indicate that this is not actually the Bank of Anytown website URL but rather is a suspicious URL that does not appear to be associated with the Bank of Anytown. This may be a website operated by a phishing attacker and is intended to deceive users.

Web interface 200 may mimic the real Bank of Anytown website, such as by using the same layout, fonts, colors, and other design elements as the real Bank of Anytown. In this case the user is encouraged to apply for one of three different kinds of accounts, namely a bronze account, silver account, or gold account.

Figure 3:
FIG. 3 is an illustration of an additional UI element.

FIG. 3 is an illustration of an additional UI element. UI element 300 may be reached if, for example, the user clicks on the "go bronze" button of UI 200 of FIG. 2. This UI appears to be a bronze account application for Bank of Anytown and again includes the suspicious URL. In this fictional application for a Bank of Anytown bronze account, once again, the layout, graphics, colors, fonts, and other elements may closely mimic the actual application page for a bronze account for the real Bank of Anytown. However, because UI element 300 is not operated by the Bank of Anytown, the information will instead be sent to a phishing attacker who may collect or sell the information. In this case, the user is encouraged to disclose name, birthdate, gender, Social Security number, home address, email address, phone number, and other information. The UI layout may even include a notice (which may appear on the real Bank of Anytown website) that this user's Social Security number is private data that should only be disclosed to a trusted source.

Ironically, this notice may be designed to give the user a false sense of security about the protection that will be afforded the sensitive data.

UI 300 includes a sample of only a few types of PII that may be compromised by a phishing website. Many different types of PII may be compromised by different websites.

In the context of the present specification, the fictional Bank of Anytown website illustrated in FIGS. 2 and 3 may be hosted on a new URL that may be as little as minutes old. Because the security services provider has not yet had an opportunity to inspect and classify the fictional website, the URL does not yet have a reliable reputation. Thus, even if the user is operating a trusted security agent, which may include a web browser plug-in, the plug-in may not be able to provide a reliable reputation for the website. In this case, the user may be warned that the URL does not yet have a reputation, but because the URL cannot yet be convicted as malicious, more aggressive action may not be practical.

In this case, the user may enter PII into the fictional website before the security agent can provide any useful remediation. Once the data have been submitted, they are in the possession of the phishing attacker, and it is difficult or impossible to claw those data back.

Figure 4:
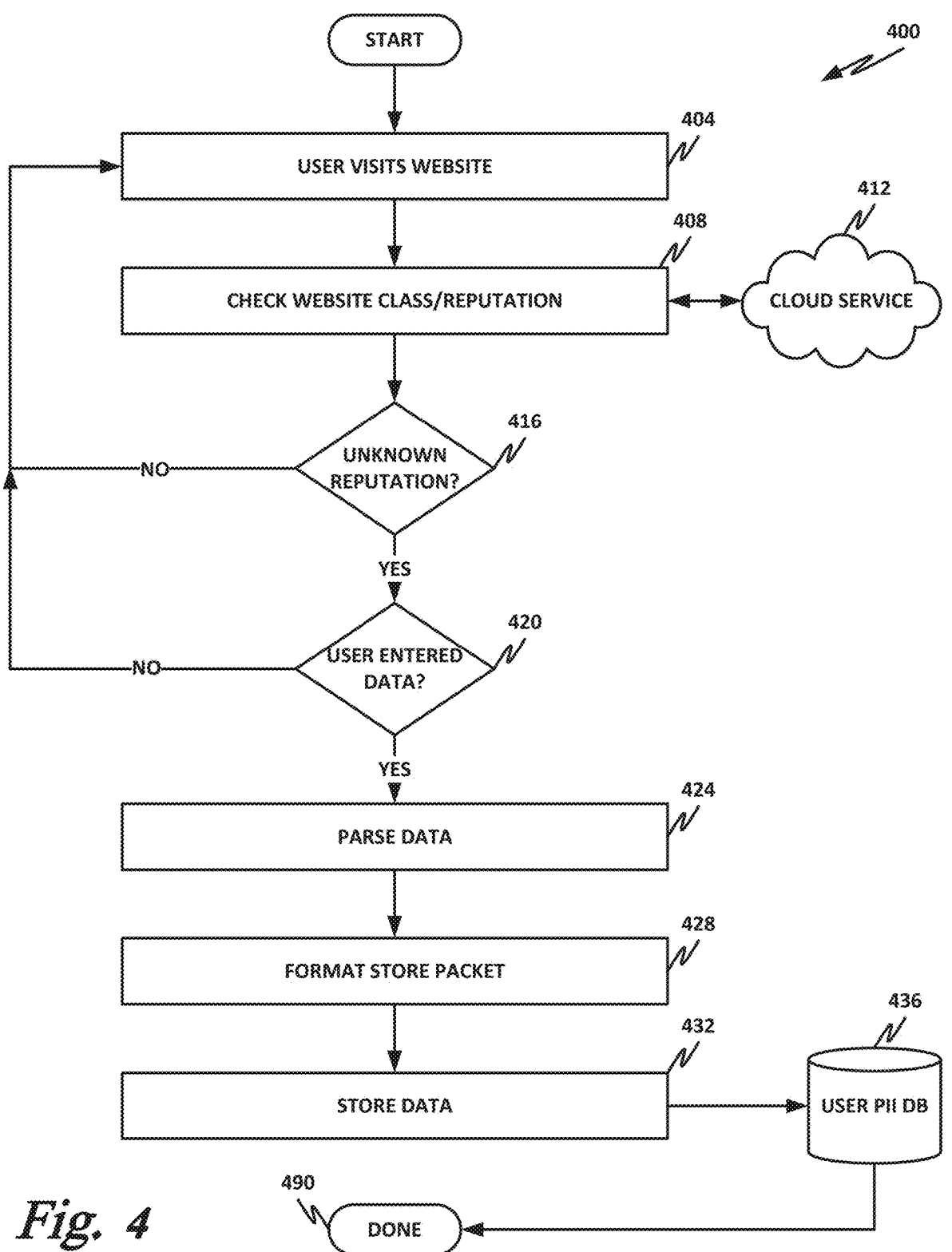
FIG. 4 is a flowchart of selected elements of a method.

FIG. 4 is a flowchart of a method 400. Method 400 may be used to determine which PII data have been sent to unknown websites.

Method 400 may be performed by a client-side monitoring application, such as a security agent.

In block 404, a user visits a website, and the visit is noticed by a security agent running on the user's device, such as a web plug-in or a background application.

In block 408, the security agent may check to determine whether the website needs to be monitored. For example, the security agent may cache reputations for known websites with a designated time to live (TTL), such as 24 hours. This avoids checking every URL every time the user interacts with the website, which could possibly be disruptive to the user's web experience. Furthermore, the security agent may have a longer lived cache of highly reliable websites that are not generally checked. If the website URL does need to be checked, then the security agent may query cloud service 412 to request a classification or reputation for the URL.

In decision block 416, the security agent determines whether the cloud service 412 returned an unknown reputation for the URL. An unknown reputation does not necessarily indicate that the URL is malicious, but the URL is at least not known safe. If the URL has a known reputation, then the security agent may act on the reputation, such as allowing the transaction for known clean websites or blocking the transaction or warning the user for known suspicious or malicious websites. After performing the known action on the known website, control may return to block 404, and the user may continue visiting websites, and the security application may continue monitoring them.

Returning to decision block 416, if the website URL has an unknown reputation, then in decision block 420, the security agent may need to determine whether the user enters data on the website. If the user enters no data, then once again, in block 404, the security agent may continue monitoring web usage.

Returning to decision block 420, if the user does enter data, then in block 424, the web application may need to parse the data to determine whether the data entered are PII data. PII data may include, for example, credit card numbers, bank account numbers, usernames and passwords, addresses, account information, Social Security numbers, passport number, proprietary data, or other PII data.

In block 428, if the security application determines that the user entered PII data, then the security application may need to format a store packet to contain the PII data. The store packet may include, for example, the URL where the PII data were entered, the content of the PII data, the type of PII data, and a date and/or time stamp, including time zone, for when the data were entered. These data may be encrypted locally.

In block 432, the data may be stored in a user PII database 436. After the data are stored in PII database 436, the storage method is done in block 490. The security agent may then return to block 404 where it may continue monitoring web activity.

Figure 5:
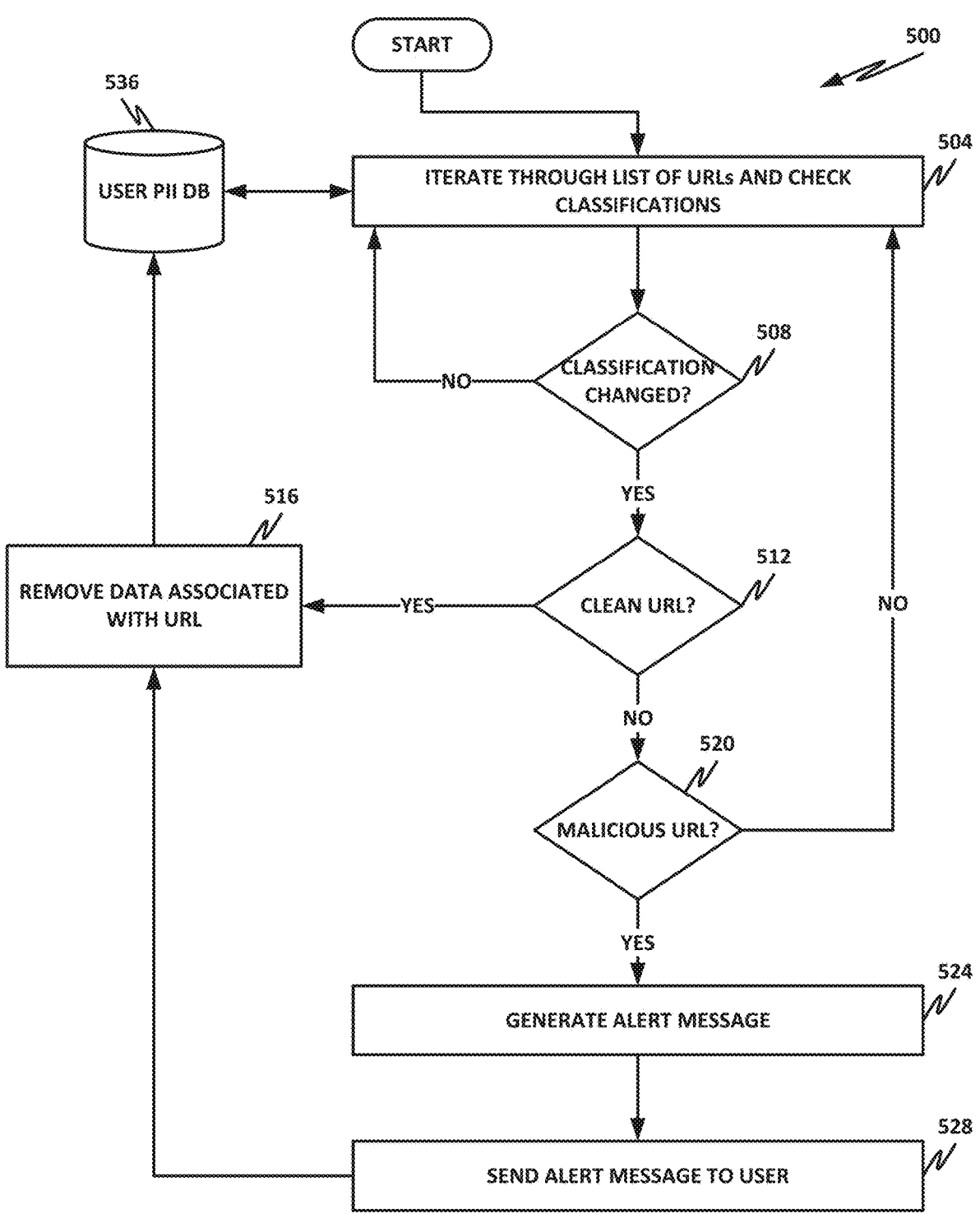
FIG. 5 is a flowchart of selected elements of a method.

FIG. 5 is a flowchart of a method 500. Method 500 may include periodic monitoring to determine whether a reputation of an unknown URL has become available. In general, once a URL is returned if the website is determined to be clean, then the data associated with the URL may be removed from user PII database 436. If the reputation is determined to be malicious, then the client may receive a message that includes an alert and a recommended action for remediating the data leakage. After the alert has been provided, the data may be cleared from user PII database 436.

Method 500 includes a user PII database 536, which may be the same database as user PII database 436 of FIG. 4, a similar database, or a different database.

In block 504, the security agent accesses user PII database 536 and iterates through the list of URLs on which the user has entered PII data. Depending on usage patterns and the size of an enterprise or group, the list may be short or long. The size of the list may determine the practicality of how often the list is queried. If the list contains only a few entries, then a query may be performed every few minutes, such as 5 or 10 minutes, to determine whether a reputation has been ascertained for the unknown URLs. If the database is very large, such as hundreds or thousands of entries, then the query may be performed on a matter of hours or even days.

In block 508, the security agent determines whether the classification for at least one unknown URL has changed. If the classification is not changed, then control may return to block 504, and the system may continue its iterative process until changes are identified.

Returning to decision block 508, if a classification has been changed, then the system will receive the classification from the cloud service and check the classification.

In decision block 512, if the system determines that the cloud service has returned a clean reputation for the URL, then no additional action may be necessary. In that case, in block 516, the URL and all associated data may be removed from user PII database 536.

Returning to decision block 512, if the URL is not clean, then in decision block 520, the system determines whether the cloud service returned a known malicious reputation. If a known malicious reputation was not returned, then the reputation may still be "yellow" or subject to additional analysis. In that case, the system may need to wait for additional analysis until a reliable action can be taken.

Returning to decision block 520, if the system has received a known malicious reputation, then in block 524, the security agent may generate an alert message and may generate an alert message, which may include a suggested remedial action.

In block 528, the alert message may be provided to the end user, such as via an alert, notification, SMS, push notification, email, or other message type. The message may indicate that the user entered data into a known phishing website and that remedial action may be necessary.

Once the user has been notified, then the unknown reputation issue has been resolved. In block 516, the URL and all associated data may be removed from user PII data 536.

One aspect of the present specification is determining that the user has entered PII data and identifying the PII data that were entered on a website. Different methods may be used for identifying different PII data. Several illustrative examples are provided below.

Username and password: these may be identified by checking the names of the HTML form and determining if they contain a username or password label. The security agent may also check if the values entered contain an email address and then another value after that, and may then make the assumption that this is a username and password.

Credit card: regular expressions may be used to identify credit cards and other bank cards. The name of the HTML form may also be used to identify credit card entry.

Bank account: the form names and regular expressions may be used to identify if bank account information was entered.

Address: the form names may be used to identify if an address was entered, and regular expression matching could also be used to identify an address-like string.

Other: regular expressions may be crafted to identify Social Security numbers, passport numbers, and other species of PII. HTML form names may also be used to identify these data.

Methods other than regular expression matching and field label matching may be used. For example, in an embodiment a machine learning (ML) algorithm such as a neural network may be trained on a large number of inputs of known types (such as username, password, social security number, bank account number, address, phone number, email, etc.) The neural network may then be used to identify which data have been provided to a website.

A message to the user may be generated automatically based on the PII data that were entered on the malicious website. An example is provided here for English language usage, but messages may also be generated in other languages. An illustrative message template may include:

---

Dear %user%,
McAfee has become aware that on the %time% you entered %pii_data% on the website %url%. This website was malicious and therefore your data has been exposed to malicious actors.
McAfee advises you to perform the following:
%Action_for_PII% (Example: Cancel the credit card which was used in the transaction).
For further information, please contact McAfee support.
Regards,
McAfee

---

The values with % s are variables that may be filled then with the following strings depending on the PII data that were entered.

% time %=the time or date stamp of when the data were sent.

% PII_data %=an enumerated list of PII data, such as credit card, username and password, address, bank account, other (Social Security, passport, social media, account information, or other).

% URL %=the URL where the data were entered.

% action_for_PII %=the action that the action that the security services provider recommends. For example, if credit card details were entered, the security services provider may advise the customer to call the bank and cancel the credit card. If a username or password were entered, the provider may advise the user to change the password. Other remedial action may also be taken as appropriate.

Figure 6:
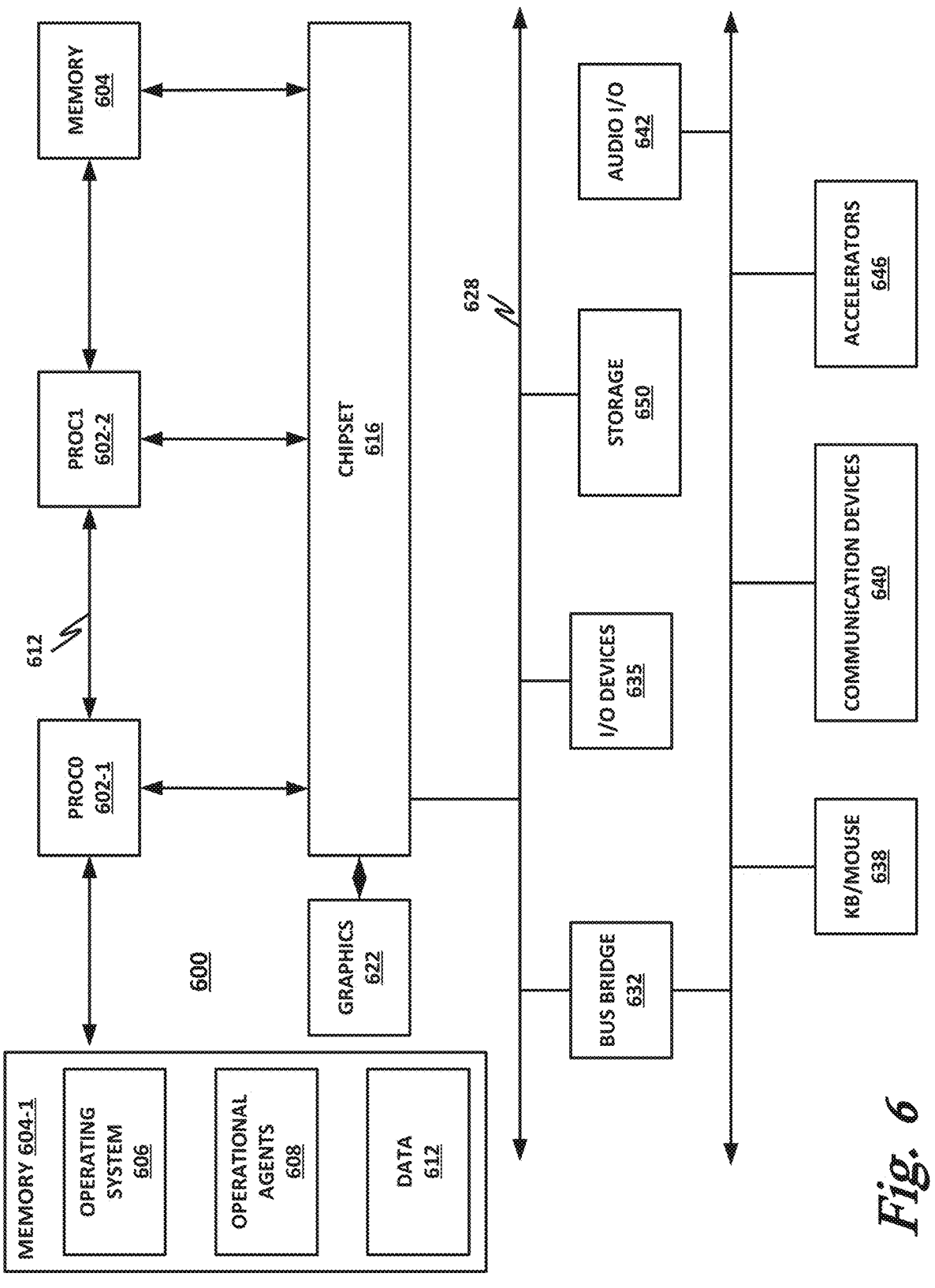
FIG. 6 is a block diagram of selected elements of a hardware platform.

FIG. 6 is a block diagram of a hardware platform 600. Hardware platform 600 may provide, for example, and endpoint device on which a user may operate a web browser, which may include a security agent software. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IOT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via a network interface, or retrieved from another source via any suitable interconnect. Once received (from any source), the instructions may be loaded into memory 604, and may then be executed by one or more processor 602 to provide elements such as an operating system 606, operational agents 608, or data 612.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a processor 602 or on one or more different dies or packages. Each chipset may support any suitable number of processors 602. A chipset 616 (which may be a chipset, uncore, Northbridge, Southbridge, or other suitable logic and circuitry) may also include one or more controllers to couple other components to one or more central processor units (CPU).

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with a processor 602 via a bus. For example, some memories may be connected via a system bus, or in a data center, memory may be accessible in a remote DMA (RDMA) configuration.

Memory 604 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of processors 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by a network interface and the various I/O devices described herein. This may include, for example, various universal serial bus (USB), FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example.

Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O 642, a data storage device 650, and/or accelerators 646. In alternative embodiments, any portions of the bus architectures could be implemented with one or more PtP links.

Operating system 606 may be, for example, Microsoft Windows, Linux, UNIX, Mac OS X, IOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more nontransitory computer-readable mediums having stored thereon executable instructions operable to instruct a processor to provide operational functions. At an appropriate time, such as upon booting hardware platform 600 or upon a command from operating system 606 or a user or security administrator, a processor 602 may retrieve a copy of the operational agent (or software portions thereof) from storage 650 and load it into memory 604. Processor 602 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QuickPath Interconnect, QPI, or KTI), FibreChannel, Ethernet, FibreChannel over Ethernet (FCOE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 600 may be virtualized, in particular the processor(s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 7. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAS, and other semiconductor chips.

Figure 7:
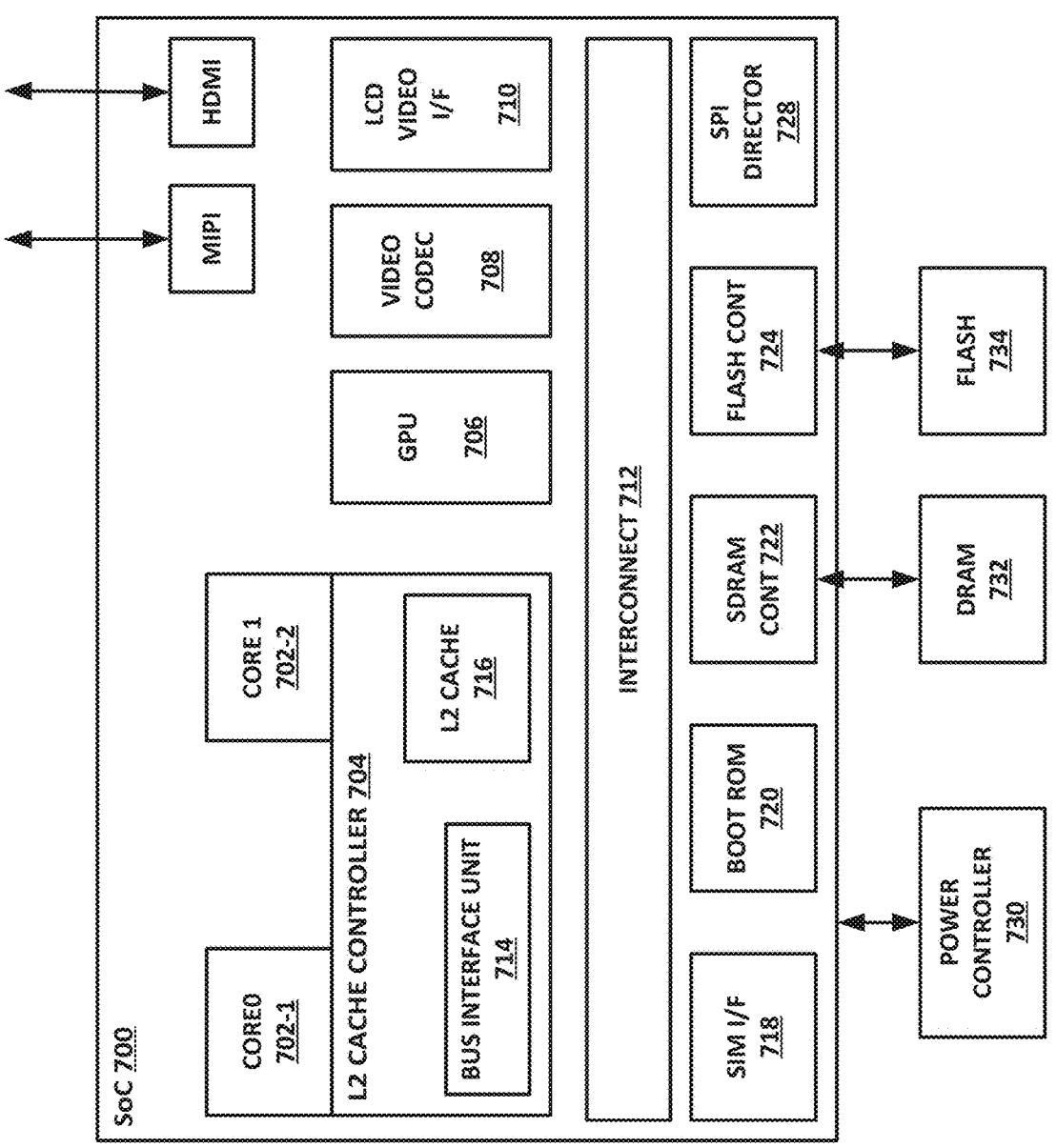
FIG. 7 is a block diagram of selected elements of a system-on-a-chip (SoC).

FIG. 7 is a block illustrating selected elements of an example SoC 700. At least some of the teachings of the present specification may be embodied on an SoC 700, or may be paired with an SoC 700. In some cases, SoC 700 may be an embodiment of a mobile device, such as a smart phone or table, on which a user may operate a web browser. SoC 700 may also include a security agent to help detect and mitigate phishing instances and data loss.

SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google *Nexus*, Microsoft Surface. SoC 700 could also be integrated into, for example, a PC, server, video processing components, laptop computer, notebook computer, netbook, or touch-enabled device.

As with hardware platform 600 above, SoC 700 may include multiple cores 702-1 and 702-2. In this illustrative example, SoC 700 also includes an L2 cache control 704, a GPU 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/HDMI links that couple to an LCD.

SoC 700 may also include a subscriber identity module (SIM) I/F 718, a boot ROM 720, a synchronous dynamic random access memory (SDRAM) controller 722, a flash controller 724, a serial peripheral interface (SPI) director 728, a suitable power control 730, a dynamic RAM (DRAM) 732, and flash 734. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 700 (or other integrated circuits) may use intellectual property blocks (IP blocks) to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

The foregoing outlines features of several embodiments so that those skilled in the art may better understand various aspects of the present disclosure. The foregoing detailed description sets forth examples of apparatuses, methods, and systems relating to a system for providing phishing mitigation accordance with one or more embodiments of the present disclosure. Features such as structure(s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to an embodiment different from the one previously described, or the same embodiment with additional features. For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without the specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a volatile or nonvolatile memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method of providing phishing mitigation, comprising:
   upon a human user accessing a website, requesting from a cloud reputation service a reputation for a uniform resource locator (URL) associated with the website;
   determining that the URL does not have a reliable reputation;
   determining that the human user has entered data into the website, and that the data comprise sensitive data;
   storing a data packet in a local-encrypted user sensitive information data store, wherein the data packet comprises the URL and at least some of the sensitive data;
   after storing the packet, periodically querying the cloud reputation service to determine whether the URL has received a reliable reputation; and
   upon determining that the URL has received a reputation as a phishing website, notifying the human user, providing a recommendation for a remedial action to protect the sensitive data, and deleting the data packet from the user sensitive information data store.

2. The computer-implemented method of claim 1, wherein the sensitive data comprise personally identifying information (PII).

3. The computer-implemented method of claim 1, wherein the sensitive data comprise sensitive business data.

4. The computer-implemented method of claim 1, wherein determining that the data comprise sensitive data includes regular expression matching.

5. The computer-implemented method of claim 1, wherein determining that the data comprise sensitive data includes matching field labels.

6. The computer-implemented method of claim 1, wherein determining that the data comprise sensitive data includes operating a neural network software.

7. The computer-implemented method of claim 1, wherein the recommendation comprises changing a username or password.

8. The computer-implemented method of claim 1, wherein the recommendation comprises canceling a credit card.

9. The computer-implemented method of claim 1, wherein the user sensitive information data store is a local database.

10. The computer-implemented method of claim 1, wherein logging the data packet comprises locally encrypting the data packet.

11. One or more tangible, nontransitory computer-readable storage media having stored thereon executable instructions to provide an endpoint security agent for an endpoint, wherein the endpoint security agent is to:

determine that a user of the endpoint has accessed a website;

request from a uniform resource locator (URL) reputation service a reputation for a URL associated with the website;

receive a response that the URL does not have a known reputation;

determine that the user has entered data into the website, and that the data comprise sensitive data;

log, into a local user sensitive information database, a data packet if comprising the URL and at least some of the sensitive data, wherein the local user sensitive information database is encrypted;

later query the URL reputation service to determine that the URL has received a new reputation; and upon determining that the new reputation is a phishing reputation, notify the user of the endpoint, recommend a remedial action to protect the sensitive data, and delete the data packet from the user sensitive information data store.

12. The one or more tangible, nontransitory computer-readable media of claim 11, wherein the sensitive data comprise personally identifying information (PII).

13. The one or more tangible, nontransitory computer-readable media of claim 11, wherein the sensitive data comprise sensitive business data.

14. The one or more tangible, nontransitory computer-readable media of claim 11, wherein determining that the data comprise sensitive data includes regular expression matching.

15. The one or more tangible, nontransitory computer-readable media of claim 11, wherein determining that the data comprise sensitive data includes matching field labels.

16. The one or more tangible, nontransitory computer-readable media of claim 11, wherein determining that the data comprise sensitive data includes operating a neural network software.

17. A computing apparatus, comprising:

a processor circuit and a memory;

a network interface;

a web browser; and an endpoint security agent, wherein the endpoint security agent comprises instructions encoded within the memory to instruct the processor circuit to:

observe a user's interaction with a website via the network interface, including a uniform resource locator (URL) associated with the website;

request, via a cloud-based URL intelligence service, a reputation for the URL;

receive a response that the URL does not have a known reputation;

determine that the user has entered data into the website, and that the data comprise sensitive data;

log, into a local user sensitive information database, a data packet comprising the URL and at least some of the sensitive data, wherein the local user sensitive information database is encrypted;

later query the URL intelligence service to determine that the URL has received a new reputation; and upon determining that the new reputation is a phishing reputation, notify the user of the computing apparatus, recommend a remedial action to protect the sensitive data, and delete the data packet from the local user sensitive information database.

\* \* \* \* \*